(12) United States Patent
Vivekanand (10) Patent No.: US 7,747,662 B2
(45) Date of Patent: Jun. 29, 2010

(54) SERVICE AWARE NETWORK CACHING (75) Inventor: Swami Vivekanand, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 302 days.

(21) Appl. No.: 11/322,864

(22) Filed: Dec. 30, 2005

(65) Prior Publication Data

US 2007/0168394 A1    Jul. 19, 2007

(51) Int. Cl.
*G06F 17/30*   (2006.01)
(52) U.S. Cl. ......................... 707/822; 707/827
(58) Field of Classification Search ................ None
See application file for complete search history.

(56) References Cited

U.S. PATENT DOCUMENTS

| | | | |
|---|---|---|---|
| 5,548,722 A * | 8/1996 | Jalalian et al. | 709/220 |
| 6,154,776 A * | 11/2000 | Martin | 709/226 |
| 6,272,598 B1 | 8/2001 | Arlitt et al. | |
| 6,356,622 B1 * | 3/2002 | Hassell et al. | 379/1.01 |
| 6,490,655 B1 * | 12/2002 | Kershaw | 711/133 |
| 6,542,964 B1 * | 4/2003 | Scharber | 711/122 |
| 6,597,684 B1 * | 7/2003 | Gulati et al. | 370/351 |
| 6,788,686 B1 | 9/2004 | Khotimsky et al. | |
| 6,816,454 B1 * | 11/2004 | Mallath et al. | 370/216 |
| 6,901,484 B2 * | 5/2005 | Doyle et al. | 711/134 |
| 2002/0035642 A1 | 3/2002 | Clarke et al. | |
| 2003/0055882 A1 * | 3/2003 | Kawamura | 709/203 |
| 2004/0003087 A1 * | 1/2004 | Chambliss et al. | 709/226 |

OTHER PUBLICATIONS

Squid Frequently Asked Questions, 2004 Team Squid, info@squid-cache.org http://www.squid-cache.org/Doc/FAQ/FAQ.html, downloaded Oct. 10, 2005, 10 pages.
Cisco Systems, Inc., "Internetworking Technologies Handbook", 3$^{rd}$ Edition, Chapter 49, 'Quality of Service Networking' www.cisco.com/univercd/cc/td/doc/cisintwk/ito_doc/qos.htm, (49-1 to 49-31) 31 pages.

* cited by examiner

*Primary Examiner*—Baoquoc N To
(74) *Attorney, Agent, or Firm*—Perkins Coie LLP (57) ABSTRACT

Embodiments of this invention provide service aware network caching. A service aware network caching device determines a service priority for traffic received from a client targeted towards a storage server connected to the caching device. The caching device transmits a response to the client based on the service priority determined by the caching device. For a particular service priority, the caching device may be configured to retrieve and store other data related to the data requested in the traffic in anticipation of subsequent requests from a client for the related data. For a particular service priority, in order to service traffic associated with a higher service priority, the caching device may also be configured to disconnect the caching device's connections to other clients or servers when the connections are associated with lower service priorities and a particular congestion state is detected.

28 Claims, 5 Drawing Sheets

SERVICE AWARE NETWORK CACHING

BACKGROUND

1. Technical Field

The invention relates to managing network traffic and, in particular, to a method and system for providing service aware network caching.

2. Description of Related Art

In the past, servers serviced network traffic as the traffic arrived at the server. For example, when multiple requests for data were received at a server, the server would service each request in the order that the server received the requests. As network traffic increased and network congestion became an issue, however, administrators began searching for ways to service network traffic better.

One approach places a network caching device between clients and a server to prevent traffic from clients that request the same data within a certain time period from repeatedly reaching the server. Instead, the network caching device services the requests, thereby allowing the server to service other requests. However, as network activity continues to increase, network caching devices, themselves, are becoming a bottleneck in networks.

BRIEF SUMMARY

Embodiments of the present invention include a method for providing service aware network caching including storing a service level definition within a network caching device. The method also includes receiving at the caching device a request from a client for data stored in a server connected to the caching device. The method further includes determining in the caching device a service priority for the request based on the service level definition. The method further includes servicing in the caching device the request based on the service priority.

The invention further includes a system and apparatus that can perform such a method.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
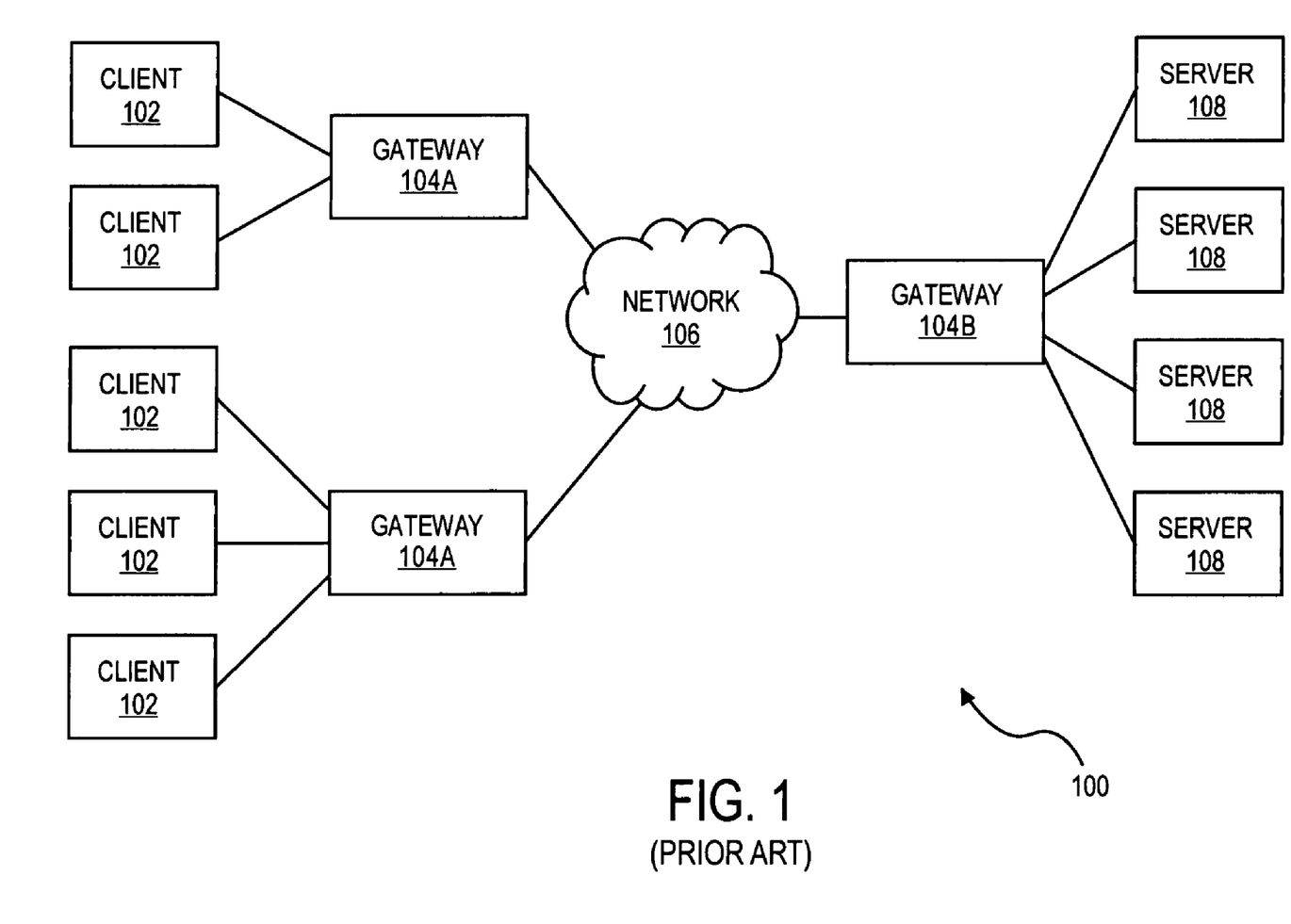
FIG. 1 is a block diagram illustrating a network environment in the prior art.

FIG. 1 is a block diagram illustrating a network environment in the prior art. In FIG. 1, a network environment 100 includes client(s) 102, gateway(s) 104a, 104b, a network 106, and server(s) 108. A client 102 is connected to a gateway 104a, which is connected to a network 106. Network 106 is connected to a server 108 via another gateway 104b. The client 102 may be, for example, a personal computer. Gateways 104a, 104b may be, for example, wired and/or wireless routers. The network 106 may be, for example, a local area network (LAN), a wide area network (WAN), a metropolitan area network (MAN), or a global area network (GAN) such as the Internet. The server 108 may be, for example, a file server or web server.

In operation, a client 102 transmits a request for data to a server 108 via the network 106 through one or more gateways 104a, 104b. In conventional systems, the server 108 may be able to differentiate between varying requests from varying clients. The server 108 may then provide different services depending on the request and/or the client. For example, the server 108 may provide guaranteed service to requests for business critical data. Such a server is considered provide quality of service (QoS) or guarantees.

Quality of service (QoS) refers to the capability of a device to provide better service to selected network traffic, independent of how the network traffic is routed. The primary goal of QoS is to provide priority, e.g. dedicated bandwidth and improved loss characteristics, to certain traffic over others. Accordingly, certain requests for data are serviced preferentially, rather than serviced in an order-of-receipt manner.

In the network environment of FIG. 1, the gateways 104a, 104b route network traffic and may even provide some protection against traffic attempting to gain unauthorized access to a server and/or client. However, the gateways themselves do not make quality of service determinations. For example, the gateways do not differentiate between different requests in order to provide priority to certain requests over others when the network is congested. Network congestion is a state in which an incremental increase in traffic (e.g. an additional request) reduces network throughput.

As traffic on the network 106 increases, a server 108 may become overloaded with requests. When a server 108 is overloaded, it may not respond a request for data within a time-out period. However, one or more clients 102 may continue to request data from the server, being unaware of the server overload. Therefore, a server overload can aggravate traffic congestion on a network.

Many systems attempt to reduce congestion by having servers send a back-off message when it becomes overloaded so that clients will know not to send additional requests for data within a certain time period. Other systems load-balance several interconnected servers to reduce risks of server overload.

Still other systems provide a network caching device, e.g. a web cache, between a client and the server. The network caching device stores recently requested data and also services requests from a client for that data. When a network caching device services a request, the number of requests to a server is reduced. In certain systems, the network caching device is located in or in front of a client (e.g. in a web cache) and services requests for data only from that client. In other systems, the network caching device is a proxy caching device located in front of the server and services requests for data from multiple clients.

In the systems described above, when the network caching device receives a request for data from a client, the network caching device checks a cache storage for the requested data. If the data is not available in the cache storage, the network caching device forwards the request for data to the server. A conventional network caching device does not perform its own quality of service determination on network traffic, e.g.

requests for data. In fact, conventional network caching devices have no service awareness.

Conventional network caching devices have no service awareness because, traditionally, their role was to reduce the number of requests being sent into a network bottleneck, i.e. a server. Network caching devices were not, themselves, sources of bottlenecks. However, as more and more users rely on a single network to retrieve a wide range of data, network traffic has increased to a point in which network caching devices themselves act as bottlenecks in the network. However, removal of a network caching device from a network environment is undesirable since network caching devices are fairly effective in their ability reduce the number of requests sent to a server.

Embodiments of this invention therefore provide a service aware network caching device. The service aware network caching device not only reduces the likelihood that the network caching device will become a bottleneck in a network environment that provides quality of service but also, in certain configurations, improves the network environment's quality of service.

Figure 2:
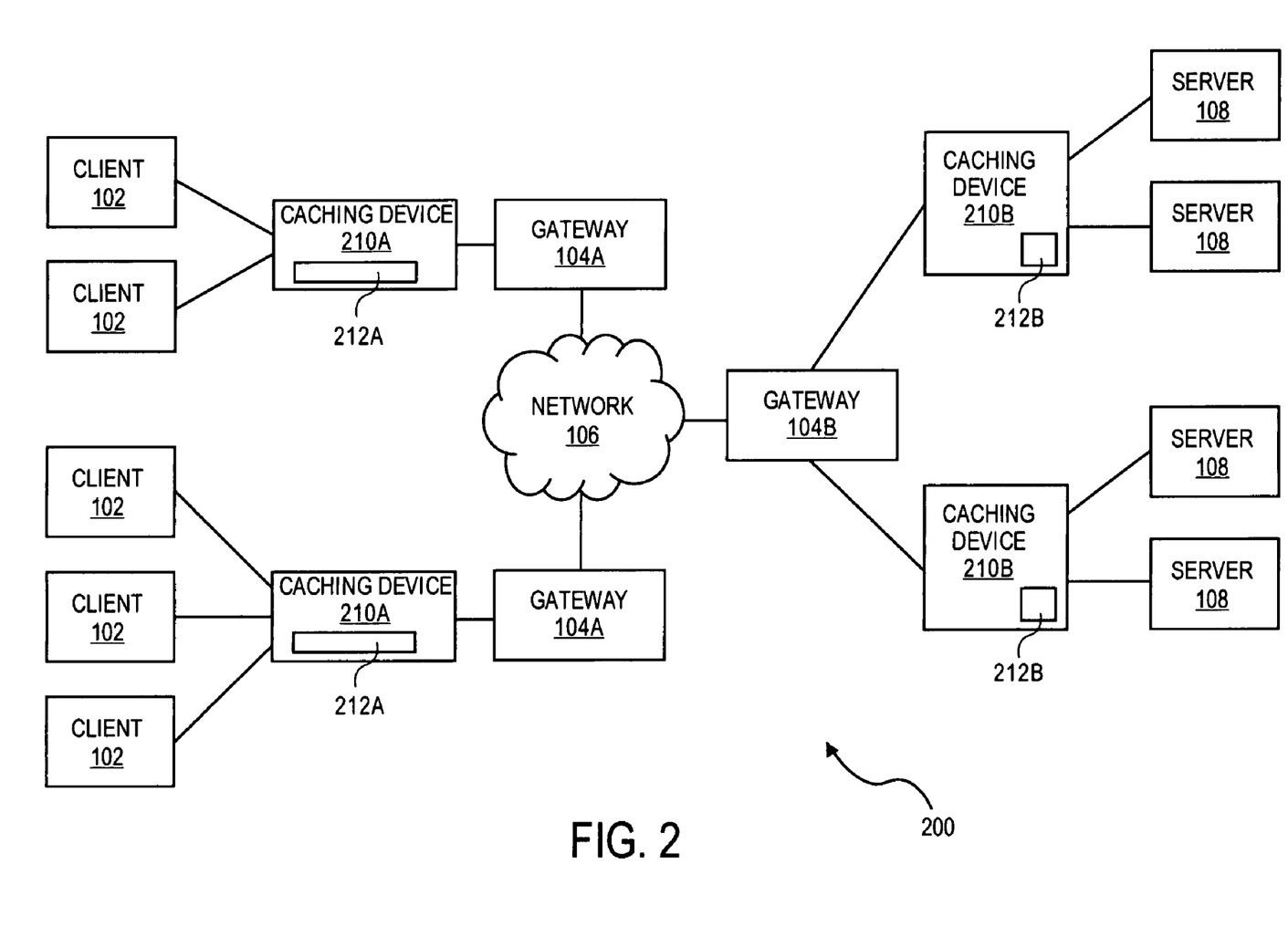
FIG. 2 is block diagram of a network environment in accordance with one embodiment of this invention.

FIG. 2 is block diagram of a network environment in accordance with one embodiment of this invention. In FIG. 2, a network environment 200 includes client(s) 102, network caching device(s) 210a, 210b, gateway(s) 104a, 104b, a network 106, and server(s) 108. As used herein, the term "client" refers to a hardware and/or software system which requests data from a server 108. As used herein, the term "server" and "server system" refers to a hardware and/or software system which provides access to data stored in a storage subsystem within the server or connected to the server. For example, the server 108 may be a storage server system, e.g. Filer® by Network Appliance, Inc. of Sunnyvale, Calif.

In FIG. 2, each network caching device 210a or 210b includes a quality of service (QoS) processor 212a or 212b, respectively. As used herein, the term "network caching device" refers to a hardware and/or software system which is located between a client and a server in a network and which is configured to store data which is a copy of data stored in the server (i.e. the server system), wherein accessing the copy of the data stored in the network caching device takes less time than accessing the original data stored in the server. The network caching device deals with traffic on the network which are communicated using network protocols, e.g. Hypertext Transfer Protocol (HTTP), File Transfer Protocol (FTP), Simple Mail Transfer Protocol (SMTP), etc. The network caching device 210 may be, for example, a NetCache® from Network Appliance, Inc. of Sunnyvale, Calif.

In FIG. 2, a client 102 is connected to a network caching device 210a, which is connected to a gateway 104a. The gateway 104a is connected to the network 106 which is connected to a server 108 via another gateway 104b and another network caching device 210b. Although, in FIG. 2, network caching devices are shown to be located both between clients and gateways (i.e. network caching devices 210a in front of the client) and between servers and gateways (i.e. network caching devices 210b in front of the server), it shall be appreciated that a network environment in accordance with embodiments of this invention may include network caching devices logically between a client and the network and not logically between a server and the network, or logically between a server and the network and not logically between a client and the network. Additionally, multiple network caching devices may be load balanced in front of their respective devices, (e.g. multiple network caching devices 210a in front of clients 102 or multiple network caching devices 210b in front of servers). The network environment shown in FIG. 2 is intended to be illustrative.

In one illustrative operation, a client 102 sends a request for data stored in a server 108. The client 102 communicates (including sending requests) with the server 108 by exchanging discrete frames or packets of data formatted according to predefined network communication protocols, such as HTTP or Transmission Control Protocol/Internet Protocol (TCP/IP). In this context, a protocol consists of a set of rules defining how the interconnected computer systems interact with one another.

The request is first received at a network caching device 210a. The QoS processor 212a in the network caching device 210a determines a service priority for the request based on service level definitions stored in the network caching device. The network caching device 210a continues processing the request based on the service priority. If the network caching device 210a cannot respond to the request with data stored in the network caching device 210a, for example, then the network caching device 210a may forward the request onto the server 108 depending on the service priority of the request.

For example, in one application, the client is a company computer. If the client's connection to the network is already congested (e.g. due to an audio file streaming to another company computer), and the current request is for business critical data, then the network caching device 210a may forward the request to the server 108, even if that action temporarily interrupts the audio stream. If, on the other hand, the request is for a web page unrelated to company business, then the network caching device 210a may simply deny the request at that time.

When the request is forwarded from the network caching device 210a onto the server 108, the request is transmitted from the network caching device 210a to a gateway 104a through the network 106 through another gateway 104b and then to a network caching device 210b in front of the server. The quality of service processor 212b in the network caching device 210b also identifies a service priority (e.g. one of numbers 0, 1, 2 . . . N, etc.) for the request. The network caching device 210b then processes the request based on the service priority. If the network caching device 210b cannot respond to the request using data stored in the network caching device 210b, the network caching device 210b may forward the request to the server 108 depending on the service priority.

For example, in one illustrative application, the network caching device 210b may immediately forward the request to the server 108 if the request originates from a certain client (e.g. a client within a domain in a guaranteed service contract with the server service provider). If the request originates from a different client, the network caching device 210b may simply place the request in a queue rather than immediately forwarding the request.

As another example, the network caching device 210b may immediately forward a request to the server 108 if the request is from a certain software application (e.g. a database application), even when a particular congestion state exists. If the request is from another application, e.g. a web browser application, the network caching device 210b may deny the request during that congestion state.

When the request is forwarded from the network caching device 210b onto the server 108, the server returns the request data to the network caching device 210b, which may store a copy of the data in the network caching device depending on the service priority of the request. When the data is transmitted to the network caching device 210a, the network caching device 210*a* may also store a copy of the data in the network caching device depending on its own service priority determination.

In one configuration, when the network caching device (e.g. 210*b*) requests the data from the server, the network caching device also requests other data, related to the originally requested data, which the network caching device anticipates the client will subsequently request. This allows the network caching device to store the other data and service a subsequent request for the related data without sending another request to the server.

In one application, either network caching devices 210*a* or 210*b* first determines if the request is for data stored in the network caching device before determining the service priority of the request. If the data is stored in the network caching device, then the request is serviced in queue. If the data is not stored in the network caching device, the caching device 210*a* or 210*b* may then determine the service priority of the request in order determine how to process the request further.

Figure 3:
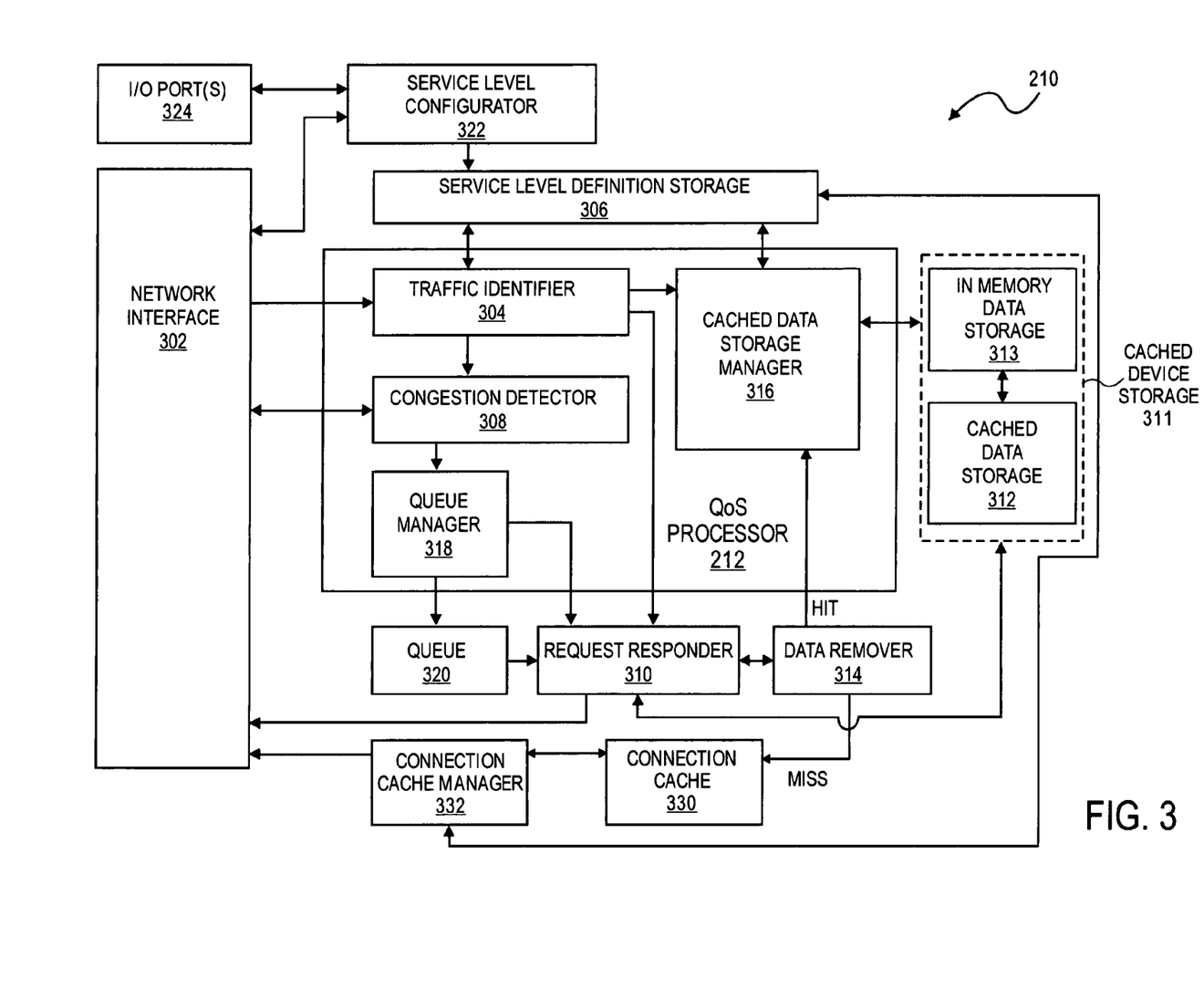
FIG. 3 is a block diagram representing any one of the caching devices shown in FIG. 2.

FIG. 3 is a block diagram representing any one of the network caching devices shown in FIG. 2. In FIG. 3, the network caching device 210 includes components which may be hardware, software, and/or firmware. The components include a network interface 302, a quality of service (QoS) processor 212, a service level definition storage 306, a service level configurator 322, an input/output (I/O) port(s) 324, a caching device storage 311, a queue 320, a request responder 310, a data retriever 314, a connection cache 330, and a connection cache manager 332. The QoS processor 212 includes a traffic identifier 304, a congestion detector 308, a queue manager 318, and a cached data storage manager 316. The caching device storage 311 includes a cached data storage 312 and an in-memory data storage 313 connected to each other. The other components in the caching device 210 are connected as shown in FIG. 3.

In operation, the network caching device 210 receives at the network interface 302 requests for data directed at the server 108. The QoS processor 212 in the network caching device 210 uses service level definitions stored in the service level definition storage 306 to determine a service priority of a received request. The service level definition may be, for example, a mapping between traffic having certain properties (e.g. source, header values, content), and service priorities (e.g. 0-N). In one embodiment, the mappings change depending on traffic conditions such that traffic having certain properties is mapped to one service priority during on one set of traffic conditions, and the same traffic is mapped to a second service priority during a different set of traffic conditions.

A service level definition is a set of parameters and values which define a service level into which network traffic is categorized. A service level definition may be defined and configured by an administrator (e.g. during installation of the caching device into the network system and/or during scheduled updates) via the network interface 302 or the I/O port(s) 324, which may connect to input/output devices such as a keyboard, a monitor, and a mouse. The network caching device 210 may also automatically and dynamically define and/or adjust a service level definition based on detected traffic patterns.

Each service level is associated with a particular service priority. In certain configurations, the service priority with which a service level is associated may change depending on a detected congestion state. For example, when no congestion is detected, all service levels may be associated with the same service priority. In other configurations, a particular service level may be statically associated with a particular service priority. For example, a service level which has guaranteed service may be associated with the highest service priority regardless of network congestion.

Based on the service priority, the traffic identifier 304 in the QoS processor 212 may forward the request to the request responder 310, e.g. for immediate response for business critical data. The traffic identifier 304 may also communicate with the congestion detector 308 to determine a level of congestion on the network. If the congestion is at a particular level, the traffic identifier 304 or the queue manager 318 may send the request directly to the request responder 310 (e.g. when the expected wait time is too long for a particular service priority). For lower service priorities, the queue manager 318 may place the request within the queue 320 based on the service priority of the request and the service priority of other requests already in the queue 320.

The request responder 310 communicates with the data retriever 314 to retrieve the data. The data retriever 318 determines whether the data is available in the cached device storage 311. If the data is available (hit), then the data retriever communicates with the cached storage manager 316 to retrieve the data from the caching device storage 311. If the data is available in the in-memory data storage 313, then the cached data storage manager 316 retrieves the data from the in-memory data storage 313. If the data is not available in the in-memory data storage 313 but available in the cached data storage 312, then the cached data storage manager 316 moves the data from the cached data storage 312 into the in-memory data storage 313. The cached data storage manager 316 then supplies the data to the data retriever 314.

In one configuration, the cached data storage manager 316 also moves data related to the requested data from the cached data storage 312 (e.g. a disk) to the in-memory data storage 313 (e.g. RAM) in anticipation of subsequent requests from the client for the related data. The caching device data storage manager 316 may move the related data whether the requested data was or was not already in the in-memory data storage 313. This allows the network caching device 210 to respond even more quickly to subsequent requests.

After the data retriever 314 retrieves the requested data, the request responder 310 transmits the data to the client via network interface 302.

If the data is not available (miss), then the data retriever 314 communicates with the connection cache 330 and the connection cache manager 332 to retrieve the data. The connection cache 330 maintains active connections to a server 108 in memory. By doing so, connections to servers are not closed once a first request to the server is completed. Rather, when a request comes again, the network caching device 210 can re-use same connection, thereby eliminating some connection establishment overhead.

In one configuration, when network traffic is high, the connection cache manager 332 accesses the service level definition storage 306 to determine which connections to close. Connections to servers which are associated with low service levels are then closed to provide additional bandwidth to high service priority traffic.

In one configuration, for a particular service level, when the data retriever 314 retrieves the requested data from the server 108, the data retriever also requests from the server related data in anticipation of subsequent requests for the related data from the client. When the requested data and the related data are received from the server, both are stored in the caching device storage 311. The network caching device 210 can then service subsequent requests for the related data without sending additional requests to the server.

In one configuration, when the requested data is received from the server, the traffic identifier 304 identifies the traffic as data from the server. The traffic identifier 304 then communicates with the cached data storage manager 316 to determine whether to cache the data or simply to forward the information to the client using the request responder. The cached data storage manager 316 may decide not to cache the data if the data is not cacheable (e.g. marked as not cacheable to maintain security) or associated with a low priority, for example.

Figure 4:
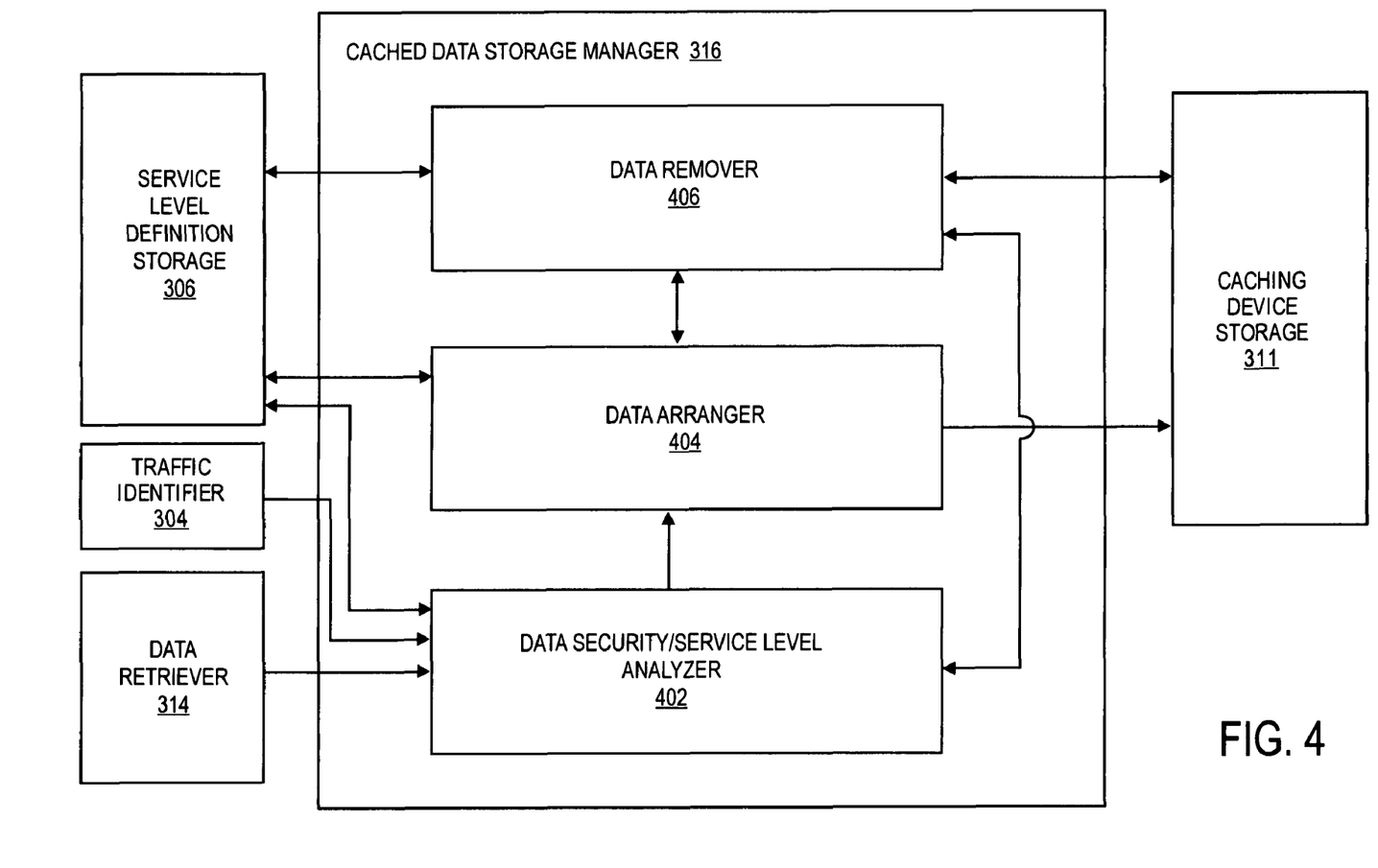
FIG. 4 is a block diagram of connections between components of the cached data storage manager of FIG. 3 and other components of the caching device.

FIG. 4 is a block diagram of connections between components of the cached data storage manager 316 of FIG. 3 and other components of the network caching device. In FIG. 4, the cached data storage manager 316 includes a data security/service level analyzer 402, a data arranger 404, and a data remover 406.

The data security/service level analyzer 402 is connected to the data retriever 314, the traffic identifier 304, the service level definition storage 306, the data arranger 404, and the data remover 406. The data arranger 404 is further connected to the service level definition storage 306, the data remover 306, and the cached data storage 312. The data remover 406 is also connected to the service level definition storage 306 and the cached data storage 312.

In operation, the data security/service level analyzer 402 receives data from the data retriever 314 or the traffic identifier 304. The data security/service level analyzer 402 determines whether the received data can be cached. The data may be secured and marked as non-cacheable, for example. If the data can be cached, the data security/service level analyzer 402 determines whether the data should be cached based on the service level associated with the data. If the data should be cached, the data security/service level analyzer 402 communicates with the data arranger 404.

The data arranger 404 determines how the data should be arranged in the caching device storage 311. If the data is high priority, the data may be placed in both the in-memory data storage 313 (RAM) and the cached data storage 312 (e.g. a disk). If the data is low priority, the data may be placed in the cached data storage 312 but not the in-memory data storage 313. If the data is high priority and the in-memory data storage 313 is low on memory, the data arranger 404 communicates with the data remover 406.

The data remover 406 removes (e.g. by moving or deleting) lower priority data stored in the in-memory data storage 313 to free storage space in the in-memory data storage 313. This allows the network caching device 210 to store higher priority data in free storage space in the in-memory data storage 313. The data remover 406 also removes lower priority data stored in the cached data storage 312 to free storage space in the cached data storage 312. This allows the network caching device 210 to store higher priority data in free storage space in the cached data storage 312.

The data remover 406 may be configured to remove data stored in the network caching device based on the service priority associated with the data, and independent of a frequency with which the data is accessed. This removal may be in response to scheduled maintenance and/or a retrieval data associated with a high service priority. For example, during a scheduled maintenance, the data remover 406 may determine service priorities associated with certain data, as opposed to simply an age of the data, and remove the date from the caching device storage if the service priority is below a particular threshold. In certain configurations, this threshold is determined by traffic patterns from which time, duration, and frequency of network congestion may be extrapolated.

Using the components shown in FIG. 3 and 4, a network caching device 210 can, for example, identify business critical traffic, e.g. urgent emails or video conference streams. The network caching device 210 can also store requested data, and data related to the requested data, in memory and on disk with a view of providing differential services based on service priorities (e.g. 0-N) and levels (e.g. level 1—receive service priority 0 at all times, level 2—receive service priority 0 unless high traffic congestion conditions, etc.). Accordingly, the network caching device may be configured to provide improved response time, priority, and/or predictability to traffic of choice.

Figure 5:
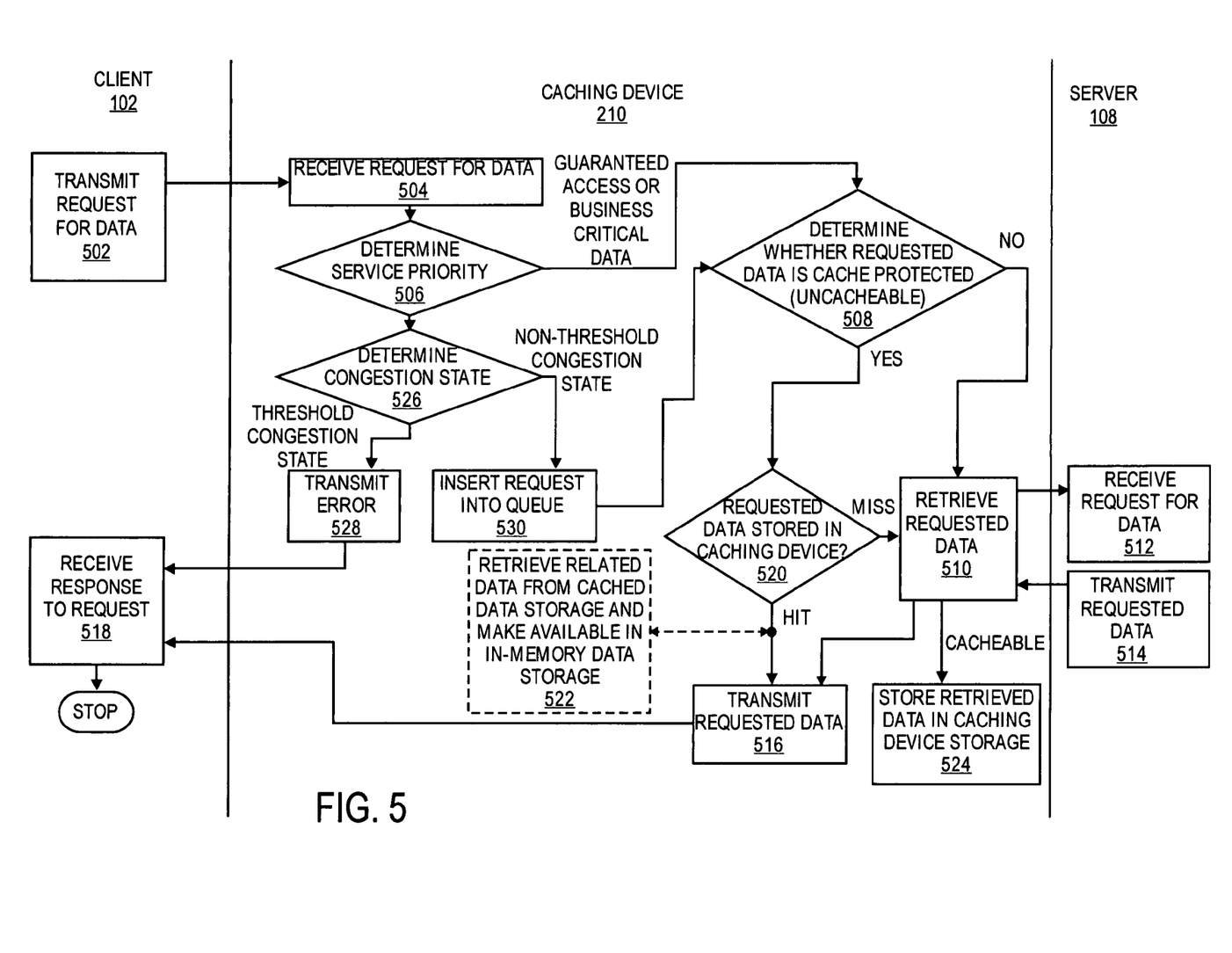
FIG. 5 is a flow diagram of an illustrative process of servicing a request for data using the caching device 210 of FIG. 3.

FIG. 5 is a flow diagram of an illustrative process of servicing a request for data using the network caching device 210 of FIG. 3. At 502, a client 102 transmits a request for data destined for a server 108. At 504, the request is received by a network caching device 210, e.g. at network interface 302. In one sense, the network caching device 210 may be considered to have intercepted the request to the server 108 in order to reduce the number of requests sent to the server.

At 506, the network caching device determines a service priority for the request. For example, the traffic identifier 304 may access the service level definition storage 306 to determine the service priority of the request based on a traffic type of the request (e.g. streaming or atomic); a source of the request (e.g. a network address of the requested data such as a uniform resource locator (URL) or a network address (e.g. an Internet Protocol (IP) address) of the requesting client), a network domain in which the requesting client exists, a media access control (MAC) address of client's network interface card, or a software application associated with the request); an extension of the requested data (e.g. a file extension); a traffic pattern; a target of the request (e.g. a target application or database); a request header; a receiving socket; a transfer protocol used to transmit the request; a format of the requested data; a packet size; a user identifier associated with the request; and/or heuristics based on at least one of the above.

If the service priority indicates that the request is associated with a service level having guaranteed access to the server or is a request for business critical data, then, at 508, the network caching device 210 determines whether the requested data is cache protected (or uncacheble).

If the requested data is cache protected, then a cache miss occurs, and the process continues to 510. At 510, the network caching device 210 retrieves the requested data (e.g. using the data retriever 314). To retrieve the requested data, the network caching device checks the connection caches 330 to determine where a connection to the server is already open. If a connection is already open, then the network caching device 210 uses the connection to request the data from the server 108. If a connection to the server is not already open, then the network caching device 210 opens a connection to the server 108. In one embodiment, when business critical traffic to the server is high, more than one connection to the server may be opened to ensure high throughput.

At 512, the server 108 receives the request for data. At 514, the server transmits the requested data to the network caching device. Because the requested data was determined at 508 to be uncacheable, the process continues to 516 in order to transmit the requested data to the client without caching the data. At 518, the client receives the requested data in a response to the request and the process ends.

If, at 508, the network caching device determines that the requested data is cacheable, then a cache hit occurs. At 520, the network caching device checks the caching device storage 311 for the requested data. If the requested data is stored in the network caching device, then the process continues to 516 where the requested data is transmitted to the client device. In one configuration, if data related to the requested data is not available in the in-memory data storage 313, the network caching device retrieves the related data from the cached data storage 312 and makes it available in the in-memory data storage 313. This configuration allows the network caching device to respond more quickly to subsequent requests for the related data.

If, at 520, the network caching device determines that the requested data is not stored in the network caching device, then the process continues to 510 to retrieve the data from the server. As discussed above, the network caching device may retrieve related data from the server as well as the requested data in order to store the related data in the network caching device in anticipation of a subsequent request from the client for the related data.

After the data is retrieved at 510, because the requested data was determined at 508 to be cacheable in this instance, the network caching device stores the retrieved data in the caching device storage at 524. The network caching device also transmits the requested data at 516.

For particular service priorities (e.g. non-guaranteed and/ or not business critical), after the network caching device determines a service priority at 506, the network caching device determine a congestion state at 526. If the congestion state is above a particular threshold for the service priority, the network caching device transmits an error at 528 rather than retrieving the requested data. The client then receives the error message as a response to its message.

If the congestion state is below a particular threshold for the service priority, however, then the network caching device inserts the request into a queue at 530. The network caching device may insert the request at the end of the queue or elsewhere if the service priority is higher than other requests already in the queue.

When the network caching device is ready to service the request further based on the queue, the network caching device determines whether the requested data is cacheable at 508, and the process continues as described above.

Thus, service aware network caching is disclosed. Although the present invention is described herein with reference to a specific preferred embodiment, many modifications and variations therein will readily occur to those with ordinary skill in the art. Accordingly, all such variations and modifications are included within the intended scope of the present invention as defined by the following claims.

Additionally, although the description above describes a request for data as network traffic for illustrative purposes, it shall be appreciated that the service aware network caching device of the present invention may be configured to provide quality of service to other types of network traffic as well.

What is claimed is:

1. A method for providing service aware network caching comprising:
   storing a service level definition within a network caching device, wherein the service level definition includes a rule defining a service level into which network traffic is categorized based on a characteristic of the network traffic;
   receiving at the network caching device, a first request from a client for data stored within a storage subsystem to which access is provided by a storage server system connected to the network caching device, wherein the network caching device is functionally coupled between the client and the storage server system;
   determining, in the network caching device, a service priority selected from a hierarchy of available service priorities for the first request based on the service level definition;
   servicing, in the network caching device, the first request based on the service priority, a detected network congestion between the client and the storage server system, and a detected cache hit of the data requested by the first request, wherein the servicing further includes,
   if the detected network congestion is above a first threshold and the service priority is below a second threshold, then transmitting an error message to the client and ignoring the first request, and
   if the service priority is above a third threshold, servicing the first request without issuing the first request to the storage server system if a cache hit has occurred and forwarding the first request to the server for servicing if a cache miss has occurred.

2. The method of claim 1, wherein servicing the first request based on the service priority comprises:
   servicing the first request prior to servicing a second request having a lower service priority independently of when the caching device received either requests.

3. The method of claim 1, wherein servicing the first request based on the service priority comprises:
   placing in a queue in the caching device the first request before a second request having a lower service priority than said first request.

4. The method of claim 1, wherein servicing the first request based on the service priority comprises:
   terminating a connection between the caching device and another server or client when a particular congestion state is detected and the connection is associated with a lower service priority than the determined service priority for said first request.

5. The method of claim 1, wherein servicing the first request based on the service priority comprises:
   retaining a connection between the caching device and another server or client even while no data is transmitting over the connection when the connection is associated with a higher service priority than the determined service priority for said first request.

6. The method of claim 1, wherein servicing the first request based on the service priority comprises,
   detecting a state of congestion on the network; and
   when the state is above a particular threshold and when the service priority is below another threshold, transmitting an error message to the client without communicating with the server.

7. The method of claim 1, wherein servicing the first request based on the service priority comprises:
   when the service priority is above a threshold, retrieving the requested data from the server when the requested data is not stored in the caching device regardless of a detected state of congestion on the network.

8. The method of claim 7, further comprising:
   storing the retrieved data in the caching device; and
   removing the data stored in the caching device based on the service priority and independently of a frequency with which the data stored in the caching device is accessed.

9. The method of claim 7, further comprising:
   retrieving from the server other data related to the requested data prior to receiving a second request from the client for the other data.

10. The method of claim 7, further comprising:
    when a data storage in the caching device has insufficient free storage space to store the retrieved data and the data storage stores other data associated with a lower service priority, removing the other data to free storage space in the data storage; and
    storing the retrieved data in the freed storage space.

11. The method of claim 1, wherein servicing the first request based on the service priority comprises:
moving the requested data from a cached data storage in the caching device to an in-memory data storage in the caching device; and
moving other data related to the requested data from the cached data storage to the in-memory data storage prior to receiving a second request from the client for the other data.

12. The method of claim 1, wherein determining the service priority for the first request comprises determining at least one of: a traffic content of the first request, a source of the first request, an extension of the requested data; a traffic pattern; a target of the first request; a request header; a receiving socket; a transfer protocol used to transmit the first request; a format of the requested data; a packet size; or a user identifier associated with the first request.

13. The method of claim 1, further comprising:
issuing, by the network caching device, the first request to the storage server if the network caching device detects a cache miss of the data request by the first request.

14. The method of claim 1, wherein service priority is determined, in part, based on a detected state of congestion on the network.

15. A network caching device comprising:
a network interface to receive a request from a client for a first set of data stored within a storage subsystem to which access is provided by a storage server system;
a service level definition storage to store service level definitions;
a quality of service (QoS) processor coupled to the network interface and the service level definition storage to determine a service priority selected from a hierarchy of available service priorities for the request based on a definition stored in the service level definition storage, wherein the definition includes a rule defining a service level into which the request is categorized based on a characteristic of the requested data;
a data retriever coupled to the QoS processor to request one or more sets of data from the server when the service priority is higher than a particular service priority;
a data storage coupled to the QoS processor and the data retriever to store the one or more sets of data based on the service priority when one or more sets of data is retrieved from the server; and
a responder in communication with the QoS processor, the data retriever, and the data storage to respond to the request from the client based on the service priority, a detected network congestion between the client and the storage server system, and a detected cache hit of the data requested by the first request, wherein the servicing further includes,
if the detected network congestion is above a first threshold and the service priority is below a second threshold, then transmitting an error message to the client and ignoring the request, and
if the service priority is above a third threshold, servicing the request without issuing the request to the data storage if a cache hit has occurred and forwarding the request to the storage server system for servicing if a cache miss has occurred.

16. The network caching device of claim 15, further comprising:
a connection cache to store information enabling the caching device to maintain connections to one or more servers and one or more clients; and
a connection cache manager coupled to the connection cache and the service level definition storage to remove the information stored in the connection cache based on the definitions stored in the service level definition storage.

17. The network caching device of claim 15 wherein the QoS processor comprises:
a data storage manager coupled to the service level definition storage, the data retriever, and the data storage to retrieve a second set of data related to the first set of the data in response to the request from the client for the first set of data.

18. The network caching device of claim 17 wherein the data storage manager comprises:
a data remover coupled to the data storage to remove a third set of data stored in the data storage when the third set of data is associated with a lower service priority than the first and second sets of data.

19. The network caching device of claim 15 wherein the QoS processor further comprises a queue manager and the caching device further comprises a queue coupled to the queue manager and the responder, wherein queue manager places the request in the queue based on the service priority for the request.

20. The network caching device of claim 15, further comprising:
an input port in communication with the service level definition storage to receive user input used to define one or more service level definitions stored in the service level definition storage.

21. A service aware network caching device comprising:
a network interface through which to communicate with one or more clients and one or more storage servers over a network;
a processor; and
a memory storing instructions which, when executed by the processor, cause the caching device to perform a set of operations comprising:
determining a service priority selected from a hierarchy of available service priorities for a request for data from a client targeted towards one of the one or more storage servers, wherein the service priority is determined from a rule defining a service level into which the request is categorized based on a characteristic of the requested data;
detecting a congestion state on the network; and
servicing the request for data without issuing the data request to the one or more storage servers, wherein the servicing further includes,
if the detected network congestion is above a first threshold and the service priority is below a second threshold, then transmitting an error message to the client and ignoring the request, and
if the service priority is above a third threshold, servicing the request without issuing the request to the storage server system if a cache hit has occurred and forwarding the request to the server for servicing if a cache miss has occurred.

22. The service aware network caching device of claim 21, the set of operations performed by the processor further comprising:
terminating connections to one or more servers and one or more clients based on the service priority and the detected congestion state on the network.

23. The service aware network caching device of claim 21, the set of operations performed by the processor further comprising:

receiving user input used to define one or more rules for determining a service priority of the request for data.

24. A method for providing service aware network caching comprising:

storing a service level definition within a network caching device, wherein the service level definition includes a rule defining a service level into which network traffic is categorized based on a characteristic of the network traffic;

receiving at the network caching device, a first request from a client for data stored within a storage subsystem to which access is provided by a storage server system connected to the network caching device;

selecting a service priority for the first request from a hierarchy of available service priorities based on the service level definition;

detecting a state of congestion on the network;

if the state of congestion is above a first threshold and the service priority is below a second threshold, then transmitting an error message to the client and ignoring the first request;

if the service priority is above a third threshold and a cache hit of the data requested by the first request occurs, then servicing the first request without issuing the first request to the storage server system; and     if the service priority is above a fourth threshold and a cache miss of the data requested by the first request occurs, then forwarding the first request to the server for servicing.

25. The method of claim 24, wherein the third threshold is equal to the fourth threshold.

26. The method of claim 24, further comprising:

receiving at the network caching device, a second request for data stored within the storage subsystem; and     responsive to detecting the service priority of the first request being below a service priority of the second request, placing the first request in a queue of the network caching device for later processing.

27. The method of claim 24, further comprising:

responsive to detecting congestion state being above a fifth threshold and detecting the service priority being below a sixth threshold, terminating a connection between the caching device and another server or client.

28. The method of claim 24, wherein the service priority for the first request is further selected based on at least one of: a traffic content of the first request, a source of the first request, an extension of the requested data; a traffic pattern; a target of the first request; a request header; a receiving socket; a transfer protocol used to transmit the first request; a format of the requested data; a packet size; or a user identifier associated with the first request.

* * * * *